Jan. 27, 1948.  W. OWEN  2,435,154
GLASS CUTTING APPARATUS
Filed Dec. 10, 1943  4 Sheets-Sheet 1
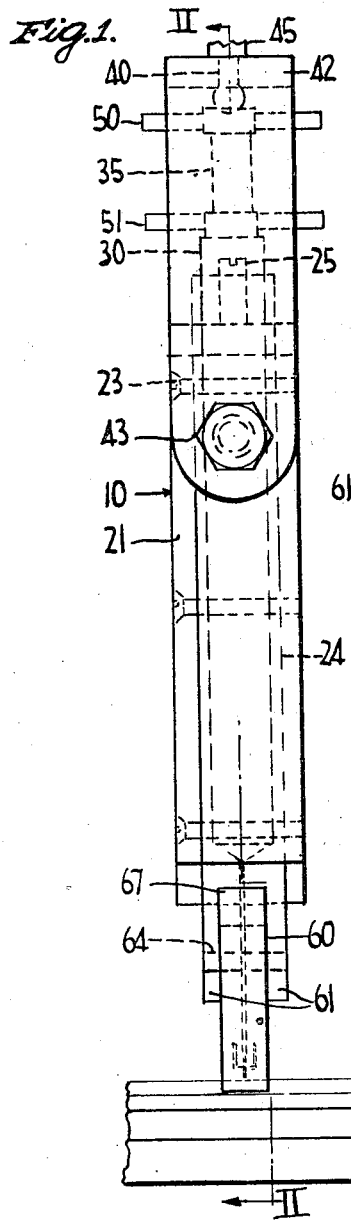
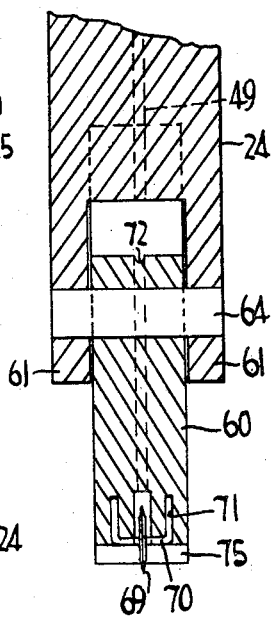
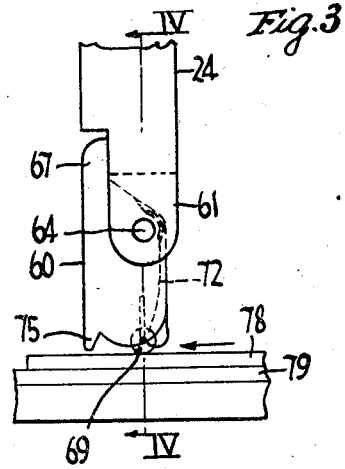
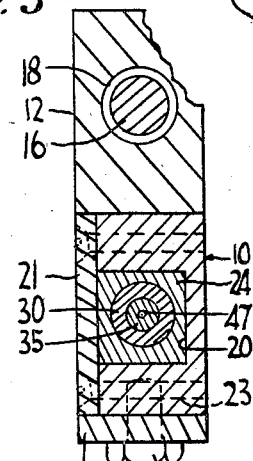
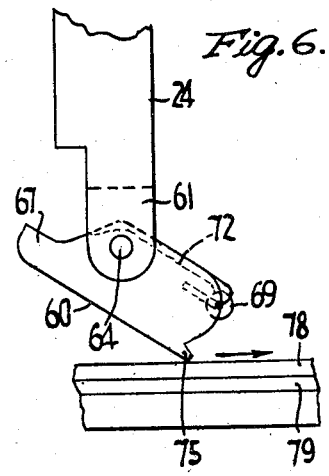
Inventor
WILLIAM OWEN
By Olen E. Bee
Attorney

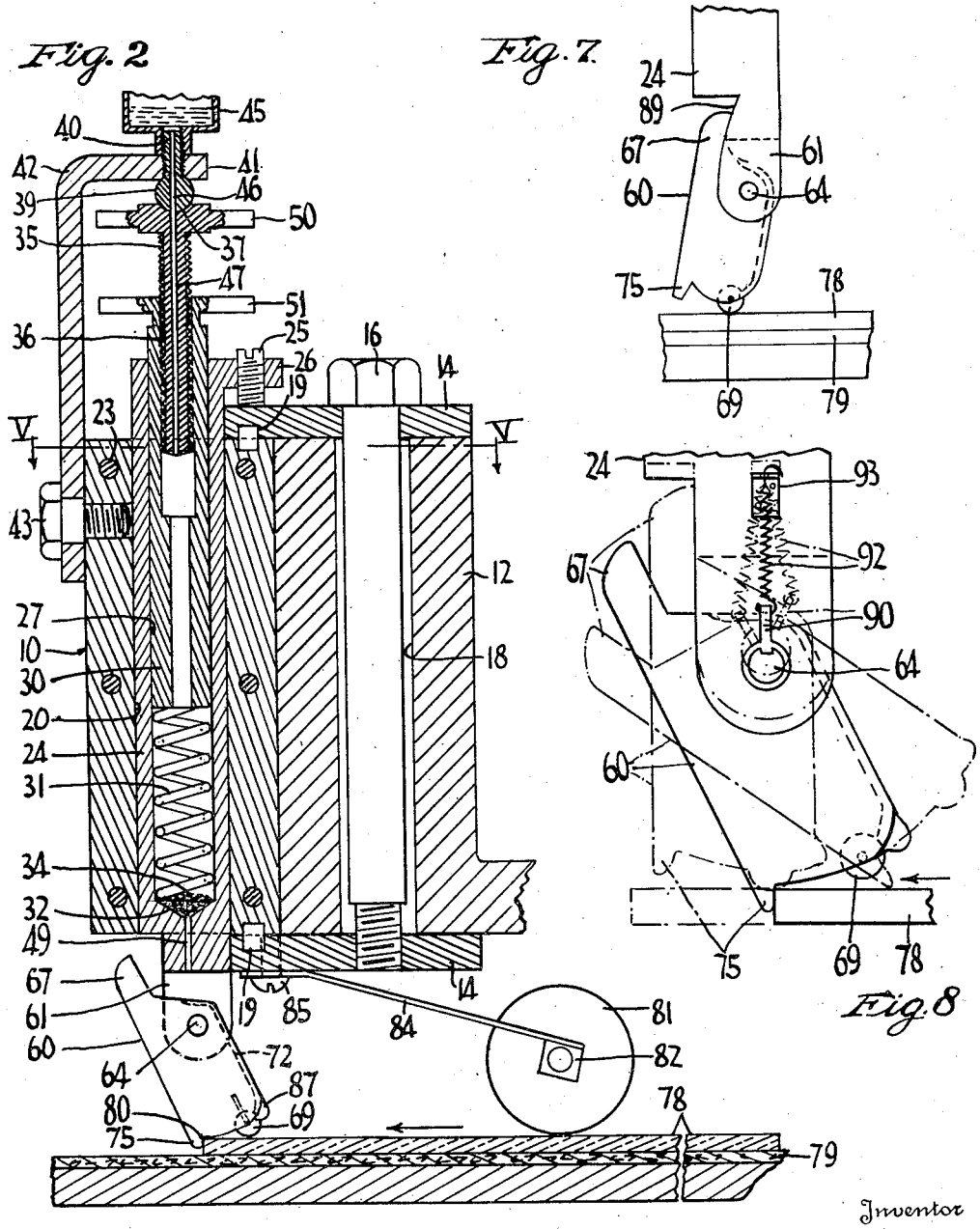

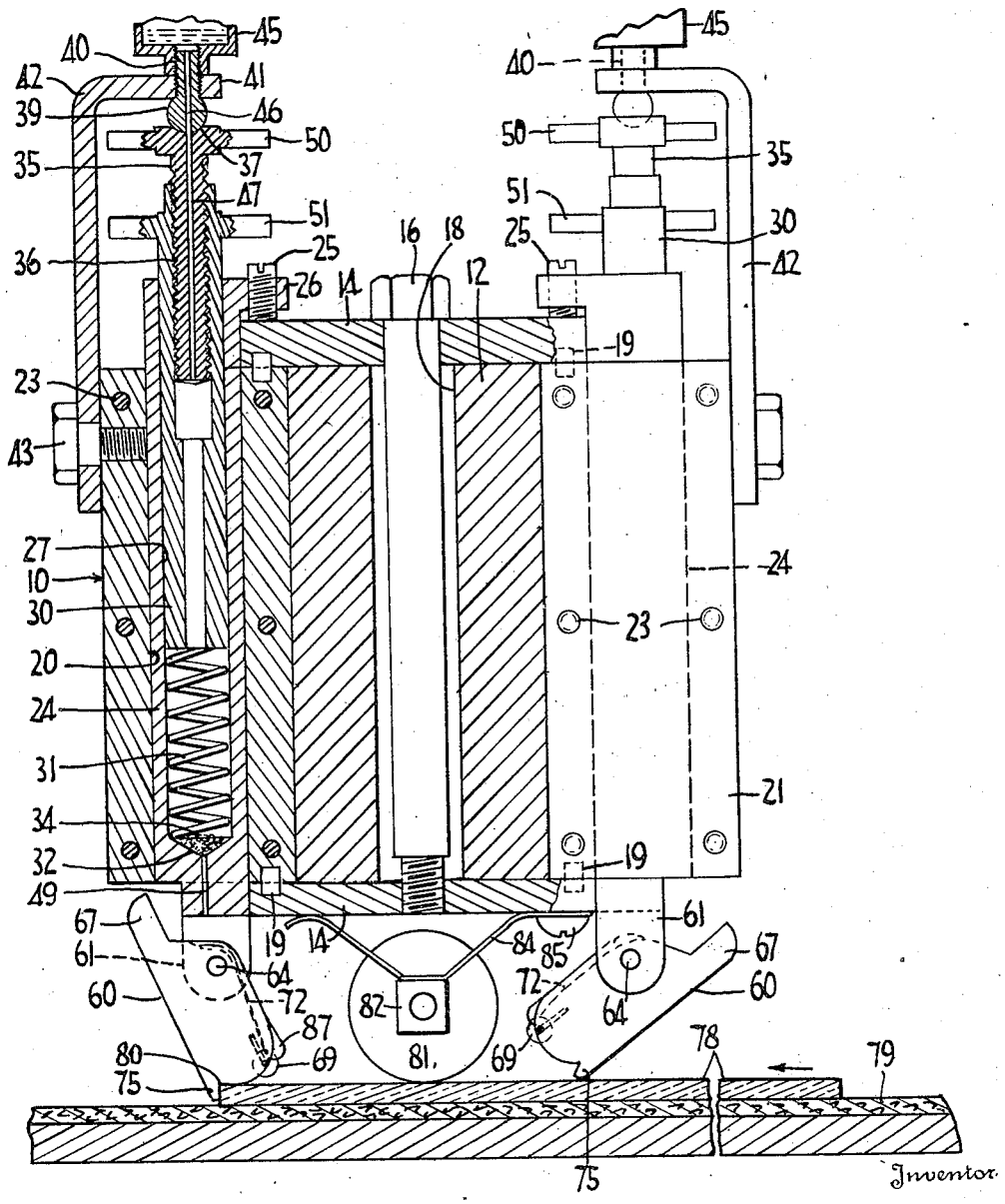

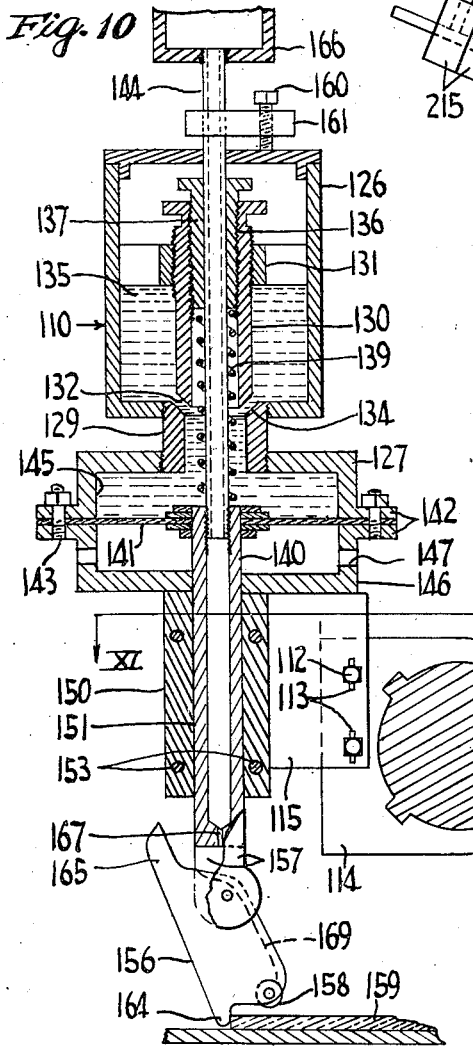
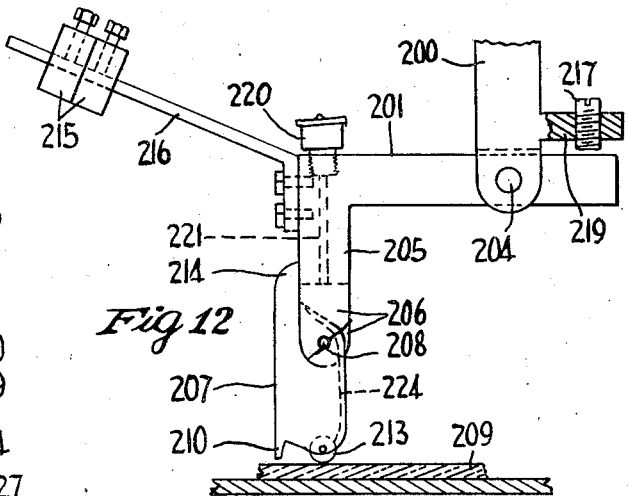
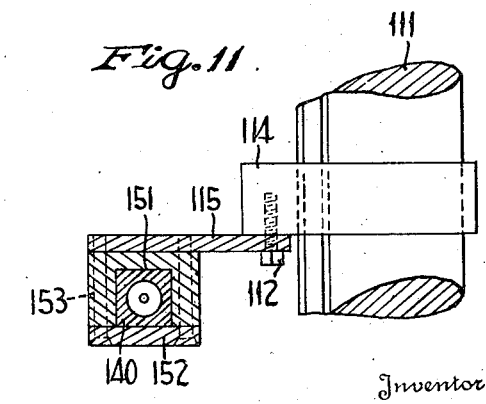

Patented Jan. 27, 1948

2,435,154

UNITED STATES PATENT OFFICE 2,435,154

GLASS CUTTING APPARATUS

William Owen, Pittsburgh, Pa., assignor to Pittsburgh Plate Glass Company, Allegheny County, Pa., a corporation of Pennsylvania Application December 10, 1943, Serial No. 513,810

7 Claims. (Cl. 33—32)

This invention relates to glass cutting apparatus and it has particular relation to mechanical cutters adapted to score sheet glass by passing the latter underneath the cutter, or by passing the cutter over the glass.

One object of the invention is to provide an improved cutter of simplified form which automatically sets itself properly for cutting upon sheet glass in response to relative movement of the cutter and glass.

Another object of the invention is to provide an improved cutter head adapted for application in various types of mechanical cutting apparatus.

In a practical form of the invention a cutter head is suspended pivotally from a holder and the lower portion of the head is provided with an element adapted to be engaged by the edge of a sheet of glass to pivot the head a predetermined degree. In connection with this pivotal action the initially contacting portion of the head is moved out of engagement with the glass edge and the cutting element is set upon the glass surface inwardly from such edge. Relative radial positions of the initially contacting portion of the cutting head and the cutting element about the pivotal axis of the head are such that the cutting element normally lies to one side of a vertical line passing through the center of gravity of the head. In pivoting the head the cutter element moves therewith substantially to a dead center position with respect to a vertical line passing through the axis of pivoting of the head and the cutter element. The head is stopped at such dead center position, or slightly beyond, by engagement of a portion of the head with the holder. During this actuation of the cutter head the holder is moved upwardly in opposition to pressure exerted downwardly by suitable means associated with the holder. Under such pressure the cutter element scores the glass in response to relative movement between the cutter and glass. The cutter head may be said to walk or step up upon the glass in response to relative movement of the glass and cutter structure. As soon as the cutter passes off the glass it automatically shifts under the influence of gravity, or under action of a spring, to such position that the cutter element will not contact the glass until the operation is repeated.

In the drawing:

Fig. 1 is a fragmentary front elevation of a glass cutting apparatus; Fig. 2 is a vertical section taken substantially along the line II—II of Fig. 1; Fig. 3 is a fragmentary side elevation of a cutter head on its support and disposed in cutting position upon a sheet of glass; Fig. 4 is a vertical section, on a larger scale, taken substantially along the line IV—IV of Fig. 3; Fig. 5 is a fragmentary horizontal section taken substantially along the line V—V of Fig. 2; Fig. 6 is a fragmentary elevation of a cutter head on its support and disposed in an idling position; Fig. 7 is a fragmentary elevation similar to Fig. 3 and illustrating a variation in form of the cutter head; Fig. 8 is a fragmentary elevation, on a larger scale, of a cutter head and its mountings; Fig. 9 is a multiple reversible cutter structure in which the invention has been embodied; Fig. 10 is a vertical section of a cutter structure in which pressure is applied hydraulically; Fig. 11 is a horizontal section taken substantially along the line XI—XI of Fig. 10; and Fig. 12 is a fragmentary side elevation of a lever type of cutter structure.

In practicing the invention a cutter holder 10 is mounted upon a support 12 by means of upper and lower clamp sections 14 overlapping upper and lower portions of the holder and drawn into clamping relation by a bolt 16 extending through the clamps and support. A suitable opening 18 is formed vertically through the support to receive the bolt freely therethrough. Dowel pins 19 projecting into the clamps and cutter holder aid in preventing relative displacement thereof.

A vertical cutter guide or channel 20 is formed centrally in the holder, one side of which is covered by a plate 21 bolted, as indicated at 23, to one side of the holder. In this instance the guide is rectangular in cross-section (Fig. 5) and receives in vertically slidable relation therein a hollow cutter stem 24 of the same cross-sectional contour. Thus the cutter stem, which is prevented from turning about its vertical axis, is vertically adjustable by manipulating a set-screw 25 that is threaded through a flange 26 formed on the upper end of the stem and in such position as to rest upon the upper side of the upper clamp section 14.

A cylindrical opening 27 is formed axially in the stem to receive a tube 30 slidably therein. A coil spring 31 abuts the lower end of the tube 30 inside the stem and its lower end rests upon a bottom wall 32 of the stem. Felt or similar fibrous material 34 is supported upon the wall 32 in the bottom of the stem. An adjusting bolt 35 which is screw-threaded, as indicated at 36, into the upper end of the tube 30 has a spherical cavity 37 formed in its top portion for receiving a spherical head 39 of a bolt 40 that is screw-threaded in a horizontal arm 41 of an upwardly-extending bracket 42. The latter is rigidly secured to the holder 10 by means of a bolt 43. An oil supply device 45 which is screw-threaded upon the upper end of the bolt 40 supplies oil through ducts 46 and 47 registering and communicating with each other and with the interior of the tube 30, and also with the hollow stem 24. Oil can thus be fed through a duct 49 in the bottom of the stem 24.

By manipulating a pair of handles 50 and 51 rigidly formed upon the bolt 35 and tube 30, respectively, and by relatively rotating the bolt and tube, compression of the spring 31 can be varied, and hence the amount of force required to move the stem 24 upwardly in the holder accordingly can be varied.

A cutter head 60 which is disposed between a pair of ears 61 formed rigidly upon the lower end of the stem 24 is pivotally supported thereon by means of a horizontal pin 64 extending rotatably through the ears and rigidly connected to the head. Movement of the head 60, which is suspended freely from the stem by the pin, is limited in a clockwise direction (Fig. 2) by means of an upper extension 67 of the head, which strikes the lower end portion of the stem 24. A wheel cutter 69 (Fig. 4) is rotatably mounted upon a U-shaped pin 70, removably fitted into openings 71 in the lower portion of the cutter head. A groove 72 formed along the edge of the cutter head receives oil which drips from the duct 49 and is conveyed by such groove to the wheel cutter. This type of wheel cutter is easily replaceable whenever a new one is desired or required because the pin 70 is held in the openings 71 by friction after it has been sprung into position therein. The head is thus suspended upon the pivot pin 64 in such manner that the wheel cutter normally is disposed to the right of a vertical axis of the stem 24 and to the right of the pivot pin 64 (Fig. 2). The center of gravity of the cutter head is located at the left of the pivot pin 64, and in its freely suspended position the cutter head is tilted in such position that a lip 75 formed on the lower head portion is exposed for contact with a sheet of glass 78. In this position of the head 60 the wheel cutter 69 is disposed slightly above the location of the base of the lip 75. Hence, a sheet of glass 78 moving underneath the cutter head upon a conveyor 79 which is adapted to travel in the direction of the arrow strikes the lip 75 and pivots the head 60 in a clockwise direction (Fig. 2) until the head extension 67 is stopped against the adjacent lower portion of the stem 24. As the head approaches this position the wheel cutter contacts the surface of the glass inwardly from its forward edge 80, and in assuming a vertical position the head forces the stem 24 upwardly in opposition to pressure exerted by the coil spring 31. The head and cutter in their cutting position (Fig. 3) are so arranged that the axis of the pivot pin 64 and the axis of the wheel cutter 69 are in substantially vertical alignment. In the position of the cutter 69 (Fig. 2) as the lip 75 and the glass edge 80 are brought into contacting relation, it is only necessary that the wheel cutter 69 clear the glass to prevent chipping of the glass edges or corners. The degree of angular swinging movement of the head 60 required to reach the cutting position is sufficient to compress the spring 31 and to maintain predetermined pressure of the wheel cutter upon the glass during the cutting operation. The greater mass of weight in the cutter head at the left side thereof (Fig. 3) constitutes means to swing the head back to a position to receive another glass sheet for cutting as shown in Fig. 2.

In order to prevent the glass from slipping upon the conveyor 79 it is engaged by a pressure roller 81 that is rotatably carried by a bearing block 82, the latter of which is rigidly mounted upon a leaf spring 84. A portion of the leaf spring remote from the bearing block 82 is bolted, as indicated at 85, to the lower clamping plate 14. The roller 81 is sufficiently large to roll easily over the edge of the glass even under considerable pressure from the leaf spring and under such pressure the glass is maintained in proper position upon the conveyor.

For purposes of safety with regard to the protection of the wheel cutter, a lug 87 is formed upon the lower portion of the head adjacent the wheel cutter 69. In the event the head 60 should become stuck in the cutting position after a cutting operation, a succeeding sheet of glass would strike the lug 87 instead of the wheel cutter 69.

It is to be understood that a cutter head of this type can be so arranged as to be pivoted in a clockwise direction beyond its vertical dead center position by cutting back the lower portion of the cutter stem as shown at 89 (Fig. 7) for stopping the extension 67 thereagainst. Since all of the structural elements with the exception noted correspond to those already described, reference characters and description set forth above apply to this figure and further detailed description thereof is not necessary.

Under certain circumstances it may be desirable to include mechanism to maintain the cutter head 60 positively in proper position to receive the glass against the lip 75. To this end, as shown in Fig. 8, an arm 90 is connected rigidly and radially to the pin 64. A tension spring 92 is secured at one end to the outer end of the radial arm 90 and its opposite end is secured to a bracket 93 that is normally disposed substantially in vertical alignment with the arm 90. Normally the arm 90 is held by the spring 92 in such position that the lip 75, arm 90, and spring 92 are in substantially vertical alignment and this is the dead-center position with respect to the spring 92 and arm 90 in connection with the pivoting of the arm about the axis of the pin 64. Any pivotal movement of the arm about the axis of the pin 64 away from such dead-center position is resisted by the spring 92. In an arrangement of this kind the cutting device can be operated upon sheet glass in a vertical, horizontal or sloping position.

In regard to relative movement of the glass and cutting elements, it is common practice in operating glass cutting machines either to move the glass underneath the cutters or to move the cutters across a table which supports the glass. Examples of apparatus operable according to these general principles are shown in my United States Patents 1,946,356 and 1,984,943. In apparatus of this general type it has also previously been customary either to shift the cutting table vertically or to raise and lower the cutter support in setting the cutting element upon the glass. However, in operating the apparatus described herein it is only necessary to determine the proper position of the cutter and relative paths of movement and then the cutter head automatically sets the cutting element upon the surface of the glass in response to relative horizontal movement of the glass and cutting apparatus.

In the event the cutter support 12 were mounted upon a bridge movable back and forth across the glass supporting structure according to the description in the patents mentioned, in the reverse movement of the cutting action the cutter head freely pivots in a counter-clockwise direction and can ride idly upon the surface of the glass, as indicated in Figs. 6 and 9. In connection with such reversible movement of the glass and cutter it is possible to cut or score the glass in opposite directions. In such operation the position of the glass can be changed in order that the forward scoring action may be at right angles to the return scoring action, or an unscored sheet of glass can be substituted to be scored by the return or reverse operation. The construction shown in Fig. 9 provides a double construction for such operations. The same mechanical arrangement of the elements as those shown in Figs. 1 and 2 are included in Fig. 9, with the exception that there are two cutter heads 60 which pivot in opposite directions to assume cutting positions. Hence, one of the wheel cutters will score the glass in one direction of relative movement of the glass and cutter and the other will operate likewise in the reverse direction of relative movement. Since the mechanical elements are the same in both cases a repetition of the description is not necessary for a thorough understanding of the structure and the same reference characters as those applied to Figs. 1 to 7 apply likewise to Fig. 9 upon which they the included.

According to Figs. 10 and 11 the invention has been incorporated in the general type of structure disclosed in U. S. Patent 2,361,049, issued October 24, 1944. In these figures a cutter unit 110 is mounted upon a horizontal support 111 by means of bolts 112, extending through slots 113 to secure mounting members 114 and 115 rigidly together and to provide a cutter supporting assembly. These slots 113 are formed in the element 115 to provide for vertical adjustment of the unit in securing it in position to be operated. This type of cutter unit comprises upper and lower casings 126 and 127, which communicate with each other through a nipple 129 rigidly connecting them. A vertically adjustable needle valve 130 is threaded centrally through a spider 131 that is rigidly secured inside and horizontally across an intermediate portion of the upper casing 126, and its lower seating end 132 cooperates with a beveled seat 134 formed in the upper end of the nipple to determine the passage therethrough of liquid 135 in the container. This liquid can be in the form of oil, glycerine, mercury, or like material. The body of the needle valve 130 has an internally threaded bore 136 in the upper end of which a guide plug 137 is threaded and in which a compression spring 139 is disposed in such position that its lower end projects downwardly through the nipple into the lower casing 127. The upper end of the spring is supported against the lower end of the plug 137 and the lower end of the spring rests against the upper end of a hollow cutter stem 140, which is secured in fluid tight relation to the central portion of a diaphragm 141 composed of flexible metal, rubber, fabric, leather, or such material as will be both flexible and impervious to liquid. The lower casing 127 is sectional and has horizontal flanges 142 between which the outer edge of the diaphragm is clamped by means of bolts 143. The upper portion of the stem 140 receives a tube section 144 screw-threaded therein to form a vertical extension thereof and has its upper end portion extending slidably through the plug 137 and upwardly through the top of the casing 126. The coil spring 139 surrounds the tube section. The lower casing 127 is thus divided into an upper liquid containing chamber 145 and a lower supporting section 146. The latter has openings 147 through which air can pass freely.

The lower casing section 146 of the unit has welded or otherwise secured thereon a vertical guide 150 including a rectangular channel 151 therein in which the cutter stem 140 is vertically slidable and over which a cover plate 152 (Fig. 11) is secured rigidly by means of screws 153. A cutter head 156 is mounted in the lower end of the stem between ears 157 formed rigidly thereon. The screws 153 also secure the sleeve to the supporting plate 115.

A wheel cutter 158 carried by the head 156 is adapted to engage a glass sheet 159 for scoring the latter. Precise adjustment of the stem and cutter can be effected by manipulating a set-screw 160 extending through a collar 161 that is rigidly secured to the upper end portion of the tube section 144. The set-screw rests upon the top of the casing 126. A lip 164, corresponding to the lip 75 previously described, responds to relative movement of the glass and cutter head until an upper end extension 165 of the head is stopped against the lower portion of the stem, thus to set the wheel cutter 158 in proper position upon the glass in the manner previously described. The top of the tube section 144 carries an oil cup 166 from which oil can flow downwardly through a duct 167 in the lower end of the stem whence it can drip into a groove 169 in the cutter head. This groove communicates with the wheel cutter 158 to maintain the latter in properly oiled condition.

According to Fig. 12 the invention has been incorporated in the type of structure disclosed in U. S. Patent 2,356,877, issued August 29, 1944. In this figure, a support 200 corresponding to the support 12 carries a lever 201 that has a pivotal connection 204 securing it thereto about a horizontal axis. A downwardly-extending cutter stem 205 integral with the lever is in the form of an angularly disposed arm which includes lower ears 206. A cutter head 207 is mounted upon a pivot pin 208 mounted horizontally in the ears 206. This head is of the same construction as the head 60. A glass plate 209 is supported below the cutter head in position to be engaged by a lip 210 formed upon the lower portion of the cutter head, which also carries a wheel cutter 213 arranged in the same manner as in the similar structure previously described. In response to relative movement of the cutter head and glass the latter moves the lip 210 to pivot the head until the lip is lifted from the edge of the glass, and the wheel cutter 213 is thereupon set on the glass. In this position an upper extension 214 of the cutter head bears against the arm 205 of the lever to maintain such head in an upright position during the cutting action. Pressure is applied to the cutter by weights 215 carried adjustably upon an arm 216 extending outwardly beyond the location of the cutter carrying arm 205. A set-screw 217 threaded through a lug 219 formed rigidly upon the support 200 engages an end of the lever 201 extending on the side of the pivot pin 204 opposite the arm 205.

By manipulating the set-screw the proper position of the cutter head can be determined with respect to its operation upon the glass.

An oil cup 220 mounted upon the lever 201 and communicating with a duct 221 in the arm 205, supplies oil to a groove 224 formed in the cutter head. The groove delivers the oil to the cutter wheel 213 to insure proper lubrication thereof during the cutting operation.

Although only illustrative forms of the invention have been shown and described in detail, it will be apparent to those skilled in the art that the invention is not so limited, but that various changes can be made therein without departing from the spirit of the invention and within the scope of the appended claims.

I claim:

1. In a cutting apparatus, a sectional cutter stem including two sections pivotally secured together, a cutting element mounted upon one of said sections, means for guiding the other section in a predetermined path of movement toward and away from work to be cut, pressure means for urging the cutter stem in its guided relation toward the work to be cut and yieldably resisting movement of the stem in a direction away from the work, stop means for limiting movement of the stem toward its cutting position, said sections being normally disposed in predetermined angular relation to each other, and stop means on the sections limiting pivotal movement thereof in one direction after the sections pivot to a position of approximate alignment to hold the cutter element in cutting position.

2. In a cutting apparatus, a sectional cutter stem including an upper section and a lower section, means for guiding the upper section upwardly and downwardly, a pivotal connection freely suspending the lower section from the upper section, a cutting element mounted upon the lower portion of the lower section at a position offset laterally from a vertical plane containing the axis of pivoting of the sections, a glass engaging portion on the lower section disposed normally directly below said pivotal connection and at a level normally below the cutting element for receiving sheet glass thereagainst, and means for limiting pivotal movement of the sections in one direction.

3. In a cutting apparatus, a sectional cutting stem including an upper section and a lower section, means for guiding the upper section upwardly and downwardly, a stop limiting downward movement of the upper section, pressure means urging the upper section downwardly in opposition to resistance afforded by the stop, a pivotal connection freely suspending the lower section from the upper section, a cutting element and a glass engaging projection angularly spaced from each other and radially spaced from the axis of the pivotal connection, said cutting element and glass engaging projection being parts of the lower section, the cutting element being normally disposed at a higher level than the projection to receive sheet glass underneath said cutting element and against the projection, and stop means limiting pivotal movement of the lower section in one direction.

4. In a cutting apparatus, a sectional cutter stem including two sections pivotally secured together, a cutting element mounted upon one of said sections, means for guiding the other section in a predetermined path of movement toward and away from work to be cut, pressure means for urging the cutter stem in its guided relation toward the work to be cut and yieldably resisting movement of the stem in a direction away from the work, stop means for limiting movement of the stem toward its cutting position, said sections being normally disposed in predetermined angular relation to each other, means connected to the sections for yieldably resisting relative movement thereof out of said predetermined angular relation, and stop means on the sections limiting pivotal movement thereof in one direction after the sections pivot to a position of approximate alignment to hold the cutter element in cutting position.

5. In a cutting apparatus for scoring sheet glass movable along a predetermined plane, a cutter support disposed adjacent the plane of movement of the glass, a swinging cutter head pivotally connected to said support and disposed in operative relation to the sheet glass to be swung by the latter, a glass-engaging element stationary with respect to the cutter head and swingable with the latter into and out of the plane of movement of the glass, and a cutter element on the cutter head swingable with the latter into and out of cutting position, said element being alternately movable into and out of the plane of movement of the glass in response to swinging action of said head.

6. In an apparatus for cutting sheet glass wherein the cutting apparatus and sheet glass are relatively movable to engage the cutting apparatus with the glass in cutting relation; a support, a cutter head pivotally connected to said support, said head having a portion forming a rigid part thereof and engageable by the glass to impart pivotal motion to the head in response to relative movement between the glass and apparatus, and a cutter element on the head engageable in cutting relation upon the glass in response to said pivotal motion.

7. In an apparatus for cutting sheet glass wherein the cutting apparatus and sheet glass are relatively movable to engage the cutting apparatus with the glass in cutting relation; a cutter head, means for pivotally supporting the cutter head in swinging relation, a cutting element on the head radially spaced from the axis of pivoting of said head, said head having a portion forming a rigid part thereof and engageable by the glass to impart pivotal motion to the head in response to the relative movement between the glass and apparatus, and means included with the head for yieldably holding said portion in position to be engaged by the glass in response to the relative movement between the glass and apparatus.

WILLIAM OWEN.

REFERENCES CITED

The following references are of record in the file of this patent:

UNITED STATES PATENTS

| Number | Name | Date |
|---|---|---|
| 2,233,847 | Phillipe | Mar. 4, 1941 |